United States Patent

Houston

[19]

[11] Patent Number: 6,114,945
[45] Date of Patent: *Sep. 5, 2000

[54] APPARATUS AND METHOD FOR PROGRAMMABLE FAST COMPARISON OF A RESULT OF A LOGIC OPERATION WITH AN SELECTED RESULT

[75] Inventor: Theodore W. Houston, Richardson, Tex.

[73] Assignee: Texas Instruments Incorporated, Dallas, Tex.

[*] Notice: This patent is subject to a terminal disclaimer.

[21] Appl. No.: 08/852,982

[22] Filed: May 8, 1997

[51] Int. Cl.$^7$ ...................................................... G06F 7/50
[52] U.S. Cl. ..................................... 340/146.2; 340/146.2
[58] Field of Search ........................................... 340/146.2

[56] References Cited

U.S. PATENT DOCUMENTS

| | | | |
|---|---|---|---|
| 5,270,955 | 12/1993 | Bosshart et al. | 364/736.5 |
| 5,699,279 | 12/1997 | Widigen et al. | 340/146.2 |
| 5,761,521 | 6/1998 | Chilinski et al. | 340/146.2 |

*Primary Examiner*—Margaret R. Wambach
*Attorney, Agent, or Firm*—Jacqueline J. Garner; Wade James Brady; Richard L. Donaldson

[57] ABSTRACT

A programmable fast comparison circuit for determining whether the result of a logic operation on two operands is the same as a specified number in advance of the completion of the actual operation includes four fast compare units coupled to each operand signal pairs of the same degree of significance for identifying possible result signal pairs of the same degree of significance. Each fast compare circuit generates a positive signal when a result signal pair is possible based on the corresponding operand bit signal pairs. Control signals determined by the specified number signal pair of the same degree of significance is used to activate one of the four fast compare circuits with the corresponding result signal pair. When the fast compare circuit activated by the control signals is a circuit generating a positive signal, the positive signal is transmitted to a combinatorial circuit. When a positive signal is transmitted by all the sets of fast compare circuits (and one result signal bit is specifically identified with a positive signal applied to the combinatorial circuit), the result number is identical with the specified number and an answer-correct signal is generated. By using the symmetry of the possible result bit signal pairs, the four fast compare circuits for each result signal pair can be reduced to two fast compare circuits. In another embodiment, N kill/generate/propagate circuits can perform a programmable fast comparison for logic operations involving two N length operands.

21 Claims, 4 Drawing Sheets

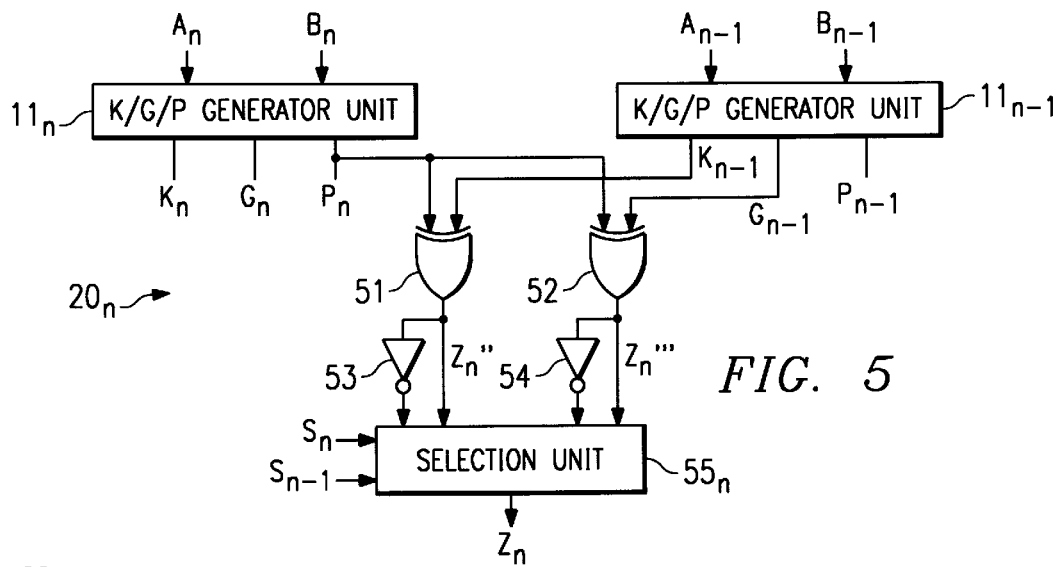
FIG. 5
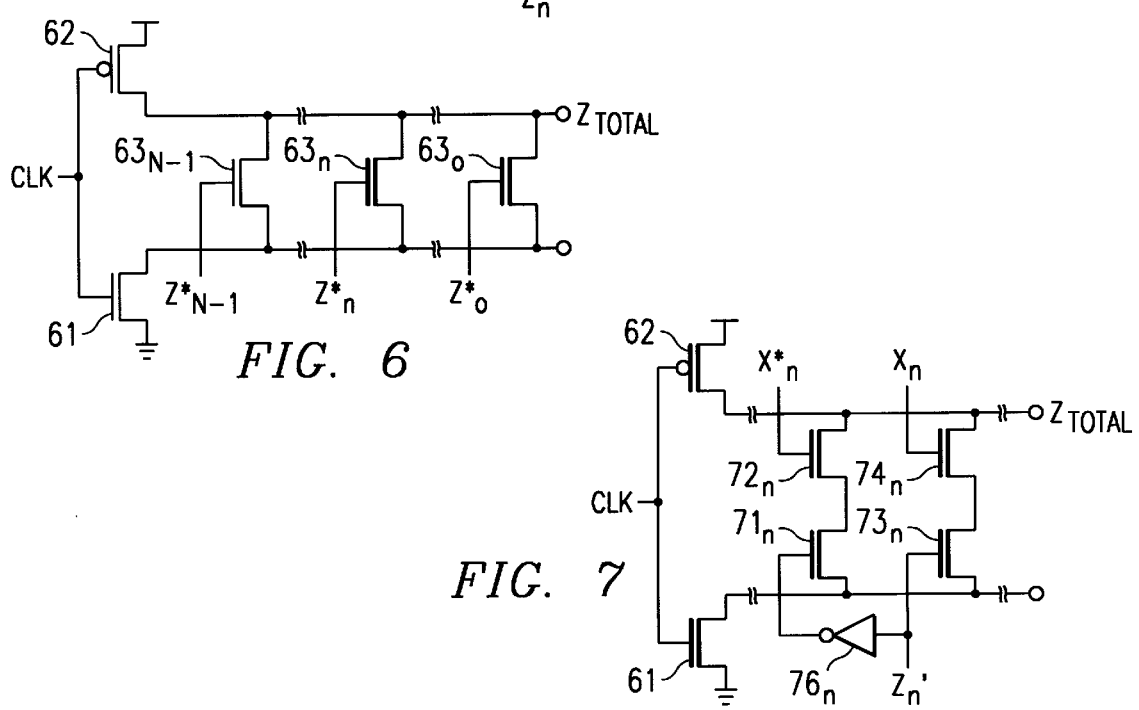
FIG. 6
FIG. 7
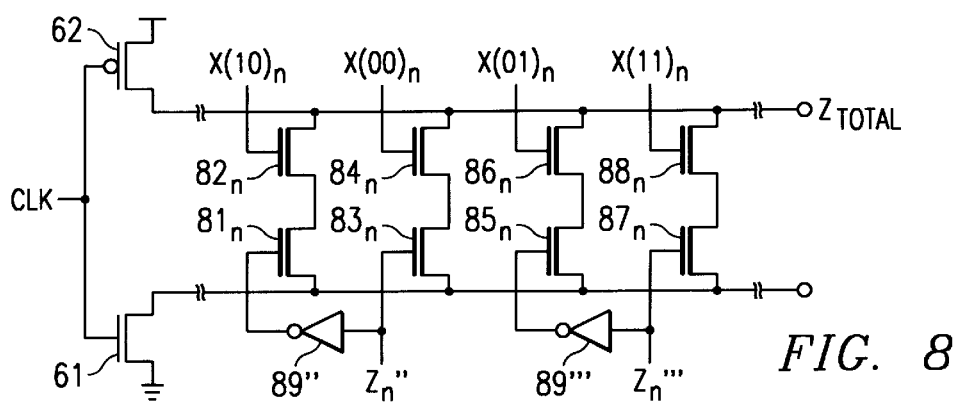
FIG. 8

APPARATUS AND METHOD FOR PROGRAMMABLE FAST COMPARISON OF A RESULT OF A LOGIC OPERATION WITH AN SELECTED RESULT

BACKGROUND OF THE INVENTION

1. Field of the Invention

This invention relates generally to the processing of digital logic signals and, more particularly, to circuits which provide a comparison between the results of a logic operation and a preselected result.

2. Description of the Related Art

A logic operation on two binary signal operands, such as addition, because of the propagation of the carry signal along a sequence of result binary digits, can be a relatively lengthy operation. Recently, Bosshart et al., in U.S. Pat. No. 5,270,955, issued on Dec. 14, 1993, and assigned to the assignee of the present Application, have disclosed fast compare units which permit comparison of the result, R, of an arithmetic or logical computation on a first operand A and a second operand B to a specified result, S, prior to the completion of the propagation of a carry bit, where A, B, R, and S are N binary bit numbers, and N represents the total number of bits per operand. It will be convenient to refer to the "$n^{th}$" bit where n is an index variable whose value extends from 0 to N−1 of the N length binary numbers. The comparison is performed on all bits in parallel, where the comparison performed at the $n^{th}$ bit can be one of 1. $R_n = 1$ when $R_{n-1} = 1$ (1,1)
2. $R_n = 1$ when $R_{n-1} = 0$ (1,0)
3. $R_n = 0$ when $R_{n-1} = 1$ (0,1)

or

4. $R_n = 1$ when $R_{n-1} = 0$ (0,0)

Block diagrams for circuits for each of these possible ($R_n$, $R_{n-1}$) results, according to the Bosshart, are shown in FIG. 1a, FIG. 1b, FIG. 1c, and FIG. 1d, respectively. Each of the four circuits includes K/G/P (Kill/Generate/Propagate) generator unit $11_n$ and K/G/P generator unit $11_{n-1}$. The circuits of FIGS. 1a and 1d include an exclusive OR logic gate $12_n$, while the circuits of FIGS. 1b and 1c include an exclusive NOR logic gate $13_n$. Each K/G/P generator unit $11_n$ has the $A_n$ and $B_n$ bit signals from operands A and B applied thereto, while the K/G/P generator unit $11_{n-1}$ has the $A_{n-1}$ and $B_{n-1}$ bit signals from operands A and B applied thereto. The output signals of the K/G/P generator unit $11_n$ are the $K_n$ (Kill) signal, the $G_n$ (Generate) signal, and the $P_n$ (Propagate) signal. The output signals of the K/G/P generator unit $11_{n-1}$ are the $K_{n-1}$ (Kill) signal, the $G_{n-1}$ (Generate) signal, and the $P_{n-1}$ (Propagate) signal. In FIG. 1a in which the fast compare unit 15 implements the (0,0) relationship, the $P_n$ and the $K_{n-1}$ signals are applied to the input terminals of exclusive OR logic gate $12_n$. In FIG. 1b in which the fast compare unit 16 implements the (0,1) relationship, the $P_n$ and the $G_{n-1}$ signals are applied to input terminals of exclusive NOR logic gate $13_n$. In FIG. 1c in which the fast compare unit 17 implements the (1,0) relationship, the $P_n$ and the $K_{n-1}$ signals are applied to input terminals of exclusive NOR logic gate $13_n$. In FIG. 1d in which the fast compare unit 18 implements the (1,1) relationship, $P_n$ and the $G_{n-1}$ signals are applied to input terminals of exclusive OR logic gate $12_n$. The Bosshart reference refers to the output of the bit comparator as the one-bit-zero signal $Z_n$. The $Z_n$ signal will be a "1" when the associated ($R_n$, $R_{n-1}$) conditions are present. Otherwise, the $Z_n$ signal will be "0", when the associated conditions are not present. The $n^{th}$ one-bit-zero signal is preferably dependent only upon the nth and $(n-1)^{th}$ bit of each operand. The least significant ($0^{th}$) bit is dependent only on the $0^{th}$ bit of each operand and a (possible) carry-in signal, $C_{in}$, because the $(n-1)^{th}$ bit is not available to the least significant one-bit-zero detector. The N one-bit-zero signals are combined to give a total compare signal $Z_{TOTAL}$. If the results of all of the N bit comparisons are true (i.e., $R_n=S_n$ if $R_{n-1}=S_{n-1}$ for all n from 1 to N−1 and $R_0=S_0$, then R=S, i.e., the result R of the operation is equal to the specified number S.

In the prior art, circuits could be constructed to do a fast comparison of the result R of a logic operation to any predetermined specified number S. Circuits could also be constructed to compare predetermined subfield of a result R to a predetermined specified subfield of S, when combined with a full calculation of the result bits of lower significance than the subfield. However, the need to provide a separate array of circuits for each result R or subfield of R has heretofore limited the usefulness of the fast compare apparatus disclosed by Bosshart.

A need has therefore been felt for a programmable fast compare apparatus wherein a result number R can be compared with a specified number S, the specified number S being progammable. This fast compare apparatus provides a flexibility with respect to the specified number S, a flexibility not found in the prior art. In addition, a need has been felt to provide programmable fast compare apparatus requiring as few implementing components as possible. A need has also been felt for a fast compare of subfield of the specified number S which is independent of the full calculation of remaining bits positions.

SUMMARY OF THE INVENTION

The aforementioned and other features are accomplished, according to the present invention, by providing fast comparison circuitry that, in response to the $n^{th}$ and the $(n-1)^{th}$ bits of each operand pair, applies a one-bit-zero signal $Z_n$ to an output terminal of the fast comparison apparatus. The one-bit-zero signal $Z_n$ represents a coincidence between an $n^{th}$ and the $(n-1)^{th}$ position signal pair, which can result from an operation on the operand, and control signals, which represent an $n^{th}$ and the $(n-1)^{th}$ position signal pair of a specified number. A combinatorial circuit, coupled to all of the fast comparison circuits, generates an output signal when all of the fast comparison circuits provide a one-bit-zero signal $Z_n$. The output signal of the combinatorial circuit indicates an equality between a result number (i.e., resulting from an operation on the operand pair) and the specified number. Alternative implementation of the fast comparison circuits are described. In another implementation of the fast comparison circuits, multiple tests (e.g., $R_n=1$ if $R_{n-1}=0$ and $R_n=1$ if $R_{n-1}=1$) can be executed simultaneously. In the preferred embodiment, it is possible to exclude any preselected bit(s) from the total comparison. In addition, a combinatorial circuit in which the one-bit-zero signals $Z_n$ are combined in a dynamic NOR logic gate compare unit is disclosed.

These and other features of the present invention will be understood upon the reading of the following description in conjunction with the Figures.

BRIEF DESCRIPTION OF THE DRAWINGS

FIG. 5 is a block diagram for yet another implementation of a fast comparison circuit with a reduced number of elements according to the present invention.

FIG. 6 is a block diagram of a combinatorial circuit for a fast comparison apparatus according to the present invention.

FIG. 7 is a block diagram of a combined selection unit and combinatorial circuit in fast comparison apparatus according to the present invention.

FIG. 8 is a block diagram of another implementation of a combined section unit and combinatorial circuit in fast comparison apparatus according to the present invention.

DESCRIPTION OF THE PREFERRED EMBODIMENT(S)

1. Detailed Description of the Drawings

FIG. 1a, FIG. 1b, FIG. 1c and FIG. 1d have been described with respect to the prior art.

Figure 1A:
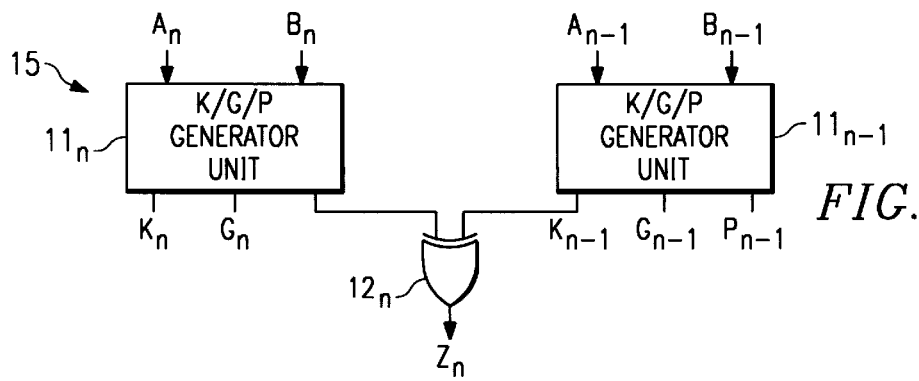
FIG. 1a, FIG. 1b, FIG. 1c, and FIG. 1d show the circuits needed to implement fast compare apparatus according to the prior art.
Figure 1B:
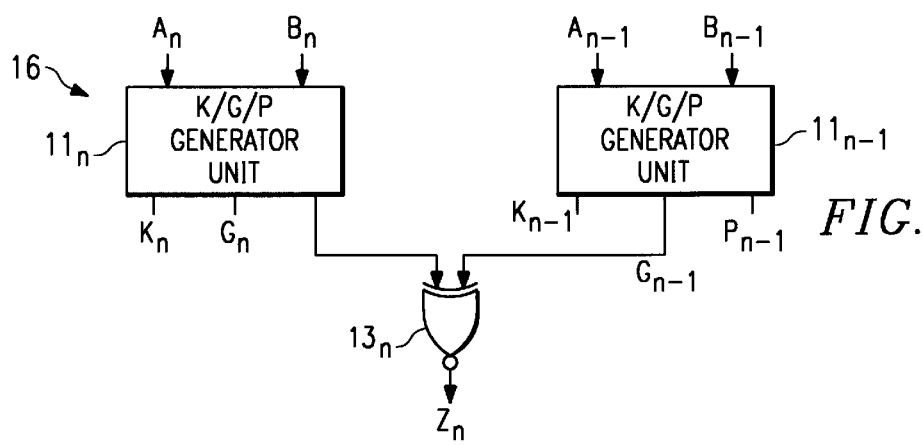
Figure 1C:
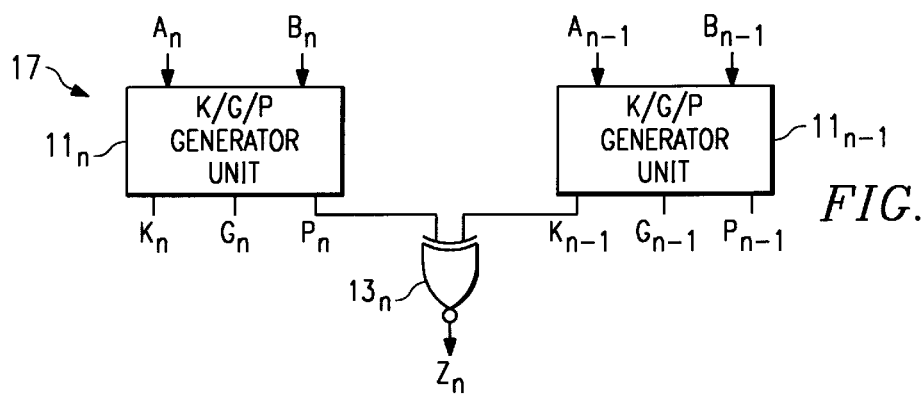
Figure 1D:
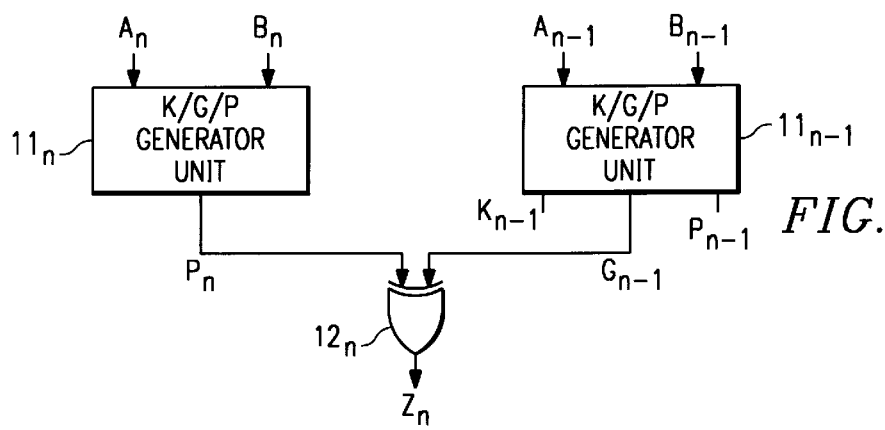
Figure 2:
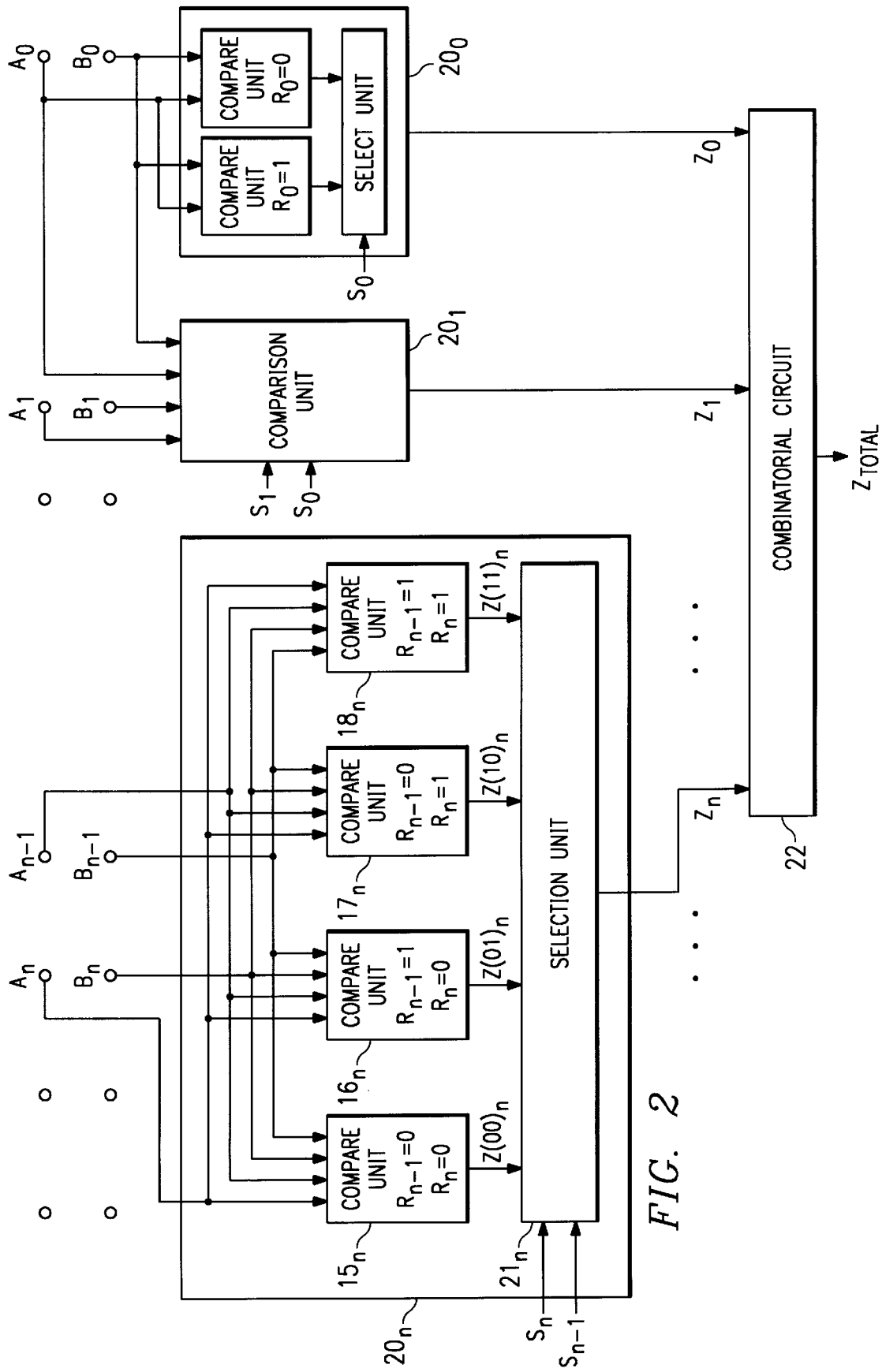
FIG. 2 illustrates programmable fast comparison apparatus including a fast comparison circuit according to the present invention.

Referring to FIG. 2, a block diagram of a first embodiment of a general programmable fast comparison apparatus is shown. The fast comparison apparatus includes N−1 fast comparison circuits 20. Each comparison circuit 20 includes each of the four fast compare units 15, 16, 17, and 18 (shown in FIGS. 1a, 1b, 1c, and 1d, respectively). Each of the four fast compare units 15–18 of each fast comparison circuit 20n receives operand bit signals $A_n$, $A_{n-1}$, $B_n$, and $B_{n-1}$. The four fast compare units 15–18 apply one-bit-zero signals $Z(00)_n$, $Z(01)_n$, $Z(10)_n$ and $Z(11)_n$, respectively, to select selection unit 21. Selection unit 21 has control signals $S_n$ and $S_{n-1}$ applied thereto. The operand bit signals $A_0$ and $B_0$ of least significance are applied to comparison circuit $20_0$. Comparison circuit $20_0$ has only $A_0$ and $B_0$ applied thereto receives only a single control signal $S_0$. Each comparison circuit $20_n$ applies a one-bit-zero output signal $Z_n$ to combinatorial circuit 22. Combinatorial circuit 22 generates an output signal $Z_{TOTAL}$. Four fast compare units 15–18 are available for each of the N bits. Each fast compare unit 15–18 generates each of the possible one-bit-zero results (four possibilities for each of the bits n=1 to n=N−1, two possibilities for the least significant bit {LSB}). Based on control signals, the selection unit $21_n$ (and the select unit $21_0$) transmit one of the one-bit-zero signals $Z_n$. When all of the $Z_n$ signals have the correct logic state, then $Z_{TOTAL}$ is true and the result R is equal to the specified number S. This apparatus and procedure allows a programmable fast comparison of result R to any specified number S.

Figure 3:
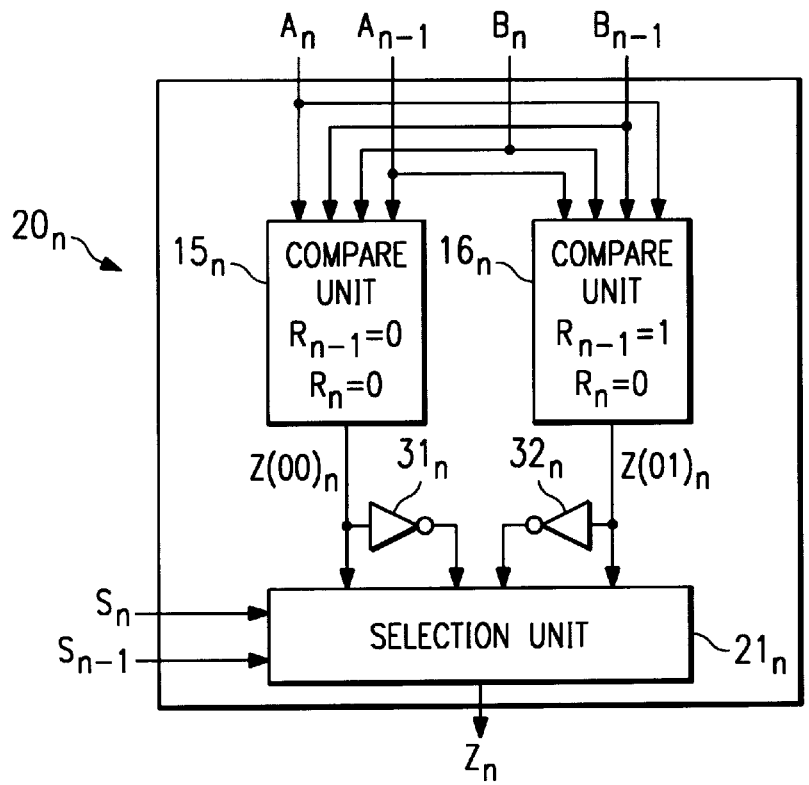
FIG. 3 is a block diagram of a fast comparison circuit with a reduced number of elements according to the present invention.

Referring to FIG. 3, a block diagram of an embodiment of the comparison circuit $20_n$ which requires fewer components than the comparison circuit $20_n$ of FIG. 2 is shown. The four operand signals $A_n$, $A_{n-1}$, $B_n$, and $B_{n-1}$ are applied to two fast compare units, $15_n$ and $16_n$. Fast compare unit $15_n$ applies signal $Z(00)_n$ to selection unit $21_n$ and to inverting amplifier $31_n$. The output signal $Z(10)_n$ of inverting amplifier $31_n$ is applied to selection unit $21_n$. The output signal $Z(01)_n$ of fast compare unit $16_n$ is applied to selection unit $21_n$ and to inverting amplifier $32_n$. The output signal of inverting amplifier $32_n$, $Z(11)_n$, is applied to selection $21_n$. The selection unit $21_n$ provides the $Z_n$ output signal.

Figure 4:
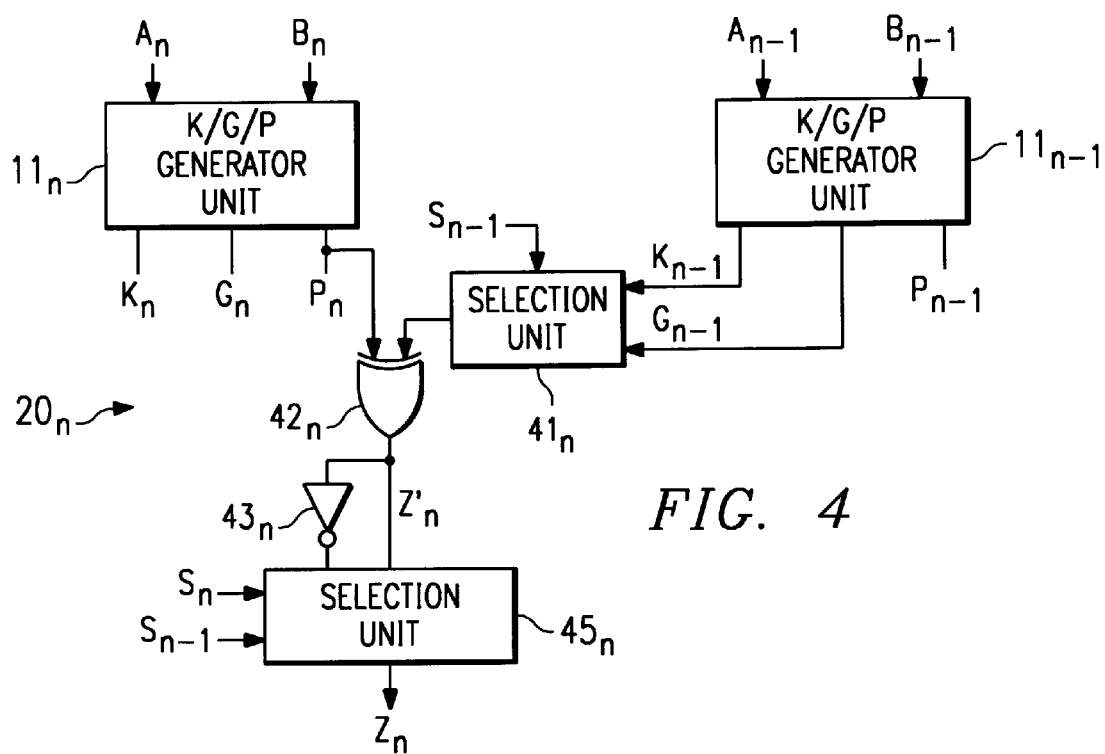
FIG. 4 is a block diagram of another implementation of the fast comparison circuit with a reduced number of components according to the present invention.

Referring to FIG. 4, operand signals $A_n$ and $B_n$ are applied to K/G/P generator unit $11_n$, operand signals $A_{n-1}$ and $B_{n-1}$ are applied to K/G/P generator unit $11_{n-1}$. The $K_{n-1}$ and the $G_{n-1}$ signals from K/G/P generator unit $11_{n-1}$ are applied to select unit $41_n$. Select unit $41_n$ receives control signal $S_{n-1}$. The output signal from selection unit $41_n$ and the output signal $P_n$ from K/G/P generator unit $11_n$ are applied to exclusive OR logic circuit $42_n$. The output signal $Z'_n$ from exclusive OR logic gate $42_n$ is applied to selection unit $45_n$ and to inverting amplifier $43_n$. The output signal from inverting amplifier $43_n$ is applied to selection unit $45_n$. Selection unit $45_n$ has control signals $S_n$ and $S_{n-1}$ applied thereto and generates the $Z_n$ output signal for application to the combinatorial circuit 22.

Referring to FIG. 5, another embodiment of a fast comparison circuit $20_n$ is shown. The K/G/P generator unit $11_n$ has operand signals $A_n$ and $B_n$ applied thereto and applies output signal $P_n$ to first input terminals of exclusive OR logic gate $51_n$ and exclusive OR logic gate $52_n$. The K/G/P generator unit $11_{n-1}$ has the operand signals $A_{n-1}$ and $B_{n-1}$ applied thereto, applies output signal $K_{n-1}$ to a second input terminal of exclusive OR logic gate $51_n$, and applies a $G_{n-1}$ signal to a second input terminal of exclusive OR logic and gate $53_n$. The output signal $Z''_n$ from exclusive OR logic gate $51_n$ is applied to select unit $55_n$ and to an input terminal of inverting amplifier 53. The output signal $Z^3_n$ from exclusive OR logic gate $52_n$ is applied to select unit $55_n$ and to an input terminal of inverting amplifier $54_n$. The output signals from inverting amplifiers $53_n$ and $54_n$ are applied to select unit $55_n$. Select unit $55_n$ has control signals $S_n$ and $S_{n-1}$ applied thereto and generates output signal $Z_n$.

Referring to FIG. 6, one embodiment of combinatorial circuit 22 is shown. A clock signal is applied to gate terminal of p-channel field effect transistor 61 and to a gate terminal of n-channel field effect transistor 61. A source terminal of transistor 61 is coupled to a supply voltage while a source terminal of transistor 62 is coupled to ground. N-channel field effect transistors $63_0$–$63_{N-1}$ have drain terminals coupled to the drain terminal of transistor 61 and source terminals coupled to the drain terminal of transistor 62. The gate terminal of each transistor $63_n$ is coupled to an output signal $Z^*_n$ (where * indicates the logical complement) of comparison unit $20_n$. The drain terminal of transistor 61 provides the $Z_{TOTAL}$ signal.

Referring to FIG. 7, a combinatorial circuit 70 is shown which includes a portion of the selection unit for each fast compare unit 11. A clock signal CLK is applied to gate terminal of p-channel field effect transistor 61 and to a gate terminal of n-channel field effect transistor 61. A source terminal of transistor 61 is coupled to a supply voltage while a source terminal of transistor 62 is coupled to ground. For each fast compare unit 20, n-channel field effect transistor $71_n$ has a source terminal coupled to a drain terminal of transistor 61 and a drain terminal coupled to a source terminal of n-channel field effect transistor $72_n$. A drain terminal of transistor $72_n$ is coupled to a drain terminal of transistor 62. A source terminal of n-channel field effect transistor $73_n$ has a source terminal coupled to a drain terminal of transistor 61, while a drain terminal of transistor $73_n$ is coupled to a source terminal of n-channel field effect transistor $74_n$. A drain terminal of transistor $74_n$ is coupled to a drain terminal of transistor 62. The $Z'_n$ signal from comparison unit $20_n$ is applied to a gate terminal of transistor $73_n$ and is coupled through inverting amplifier $76_n$ to a gate terminal of transistor $71_n$. The signal $X^*_n$ is applied to a gate terminal of transistor $72_n$ while the signal $X_n$ is coupled to a gate terminal of $74_n$, where $X^*_n$ is the result of an exclusive OR logic operation on $S_n$ and $S_{n-1}$ and $X_n$ is the result of an exclusive OR logic operation on $S_n$ and $S_{n-1}$.

Referring to FIG. 8, an embodiment of a combination of the selection unit 55 (shown in FIG. 5) with the combinatorial circuit 22 is shown. A clock signal CLK is applied to gate terminal of p-channel field effect transistor 61 and to a gate terminal of n-channel field effect transistor 61. A source terminal of transistor 61 is coupled to a supply voltage while a source terminal of transistor 62 is coupled to ground. N-channel field effect transistors $81_n$, $83_n$, $85_n$, and $87_n$ have their source terminals coupled to the drain terminal of transistor 61, and have their drain terminals coupled to the source terminals of n-channel field effect transistors $82_n$, $84_n$, $86_n$, and $88_n$, respectively. The drain terminals of transistors $82_n$, $84_n$, $86_n$, and $88_n$ are coupled to the drain terminal of transistor 62. The signal $Z''_n$ of fast comparison unit $20_n$ is coupled to a gate terminal of transistor $83_n$ and, and through inverting amplifier $89''_n$, to a gate terminal of transistor $81_n$. The signal $Z^3_n$ from fast compare unit $20_n$ is applied to a gate terminal of transistor $87_n$ and, through inverting amplifier $89^3_n$, to a gate terminal of transistor $85_n$. The signals $X(10)_n$, $X(00)_n$, $X(01)_n$, and $X(11)_n$ from comparison unit $20_n$ are applied to gate terminals of transistors $82_n$, $84_n$, $86_n$ and $88_n$, respectively.

2. Operation of the Preferred Embodiment(s)

The general block diagram of FIG. 2 is useful in understanding the concept of the programmable fast comparison apparatus. Signals from the $n_{th}$ and $(n-1)^{th}$ bit positions of operands A and B, which are the subject of a logic operation, are applied to four fast compare units. Each fast compare unit determines whether the operation result in one of the four possible combinations logic signals in the $n^{th}$ and $(n-1)^{th}$ bit position of the result number. The fast compare units identifying a possible combination resulting from the operation applies a one-bit-zero signal, $Z_n$, to the selection circuit. The selection circuit, based on control signals which are defined by the nth and (n-1)th bit position of a specified number, couples an associated fast compare unit or fast compare units to a combinatorial circuit. A one-bit-zero signal $Z_n$ generated by a fast compare unit is thus applied to the combinatorial circuit when the $n^{th}$ and $(n-1)^{th}$ bit position of the result number can be the same as the $n^{th}$ and $(n-1)^{th}$ bit position of the specified number. When one-bit-zero signals $Z_n$ are applied to the combinatorial circuit from all of the fast compare units, the result number and the specified number are the same and the signal is generated by the combinatorial circuit.

In the preferred embodiment(s) of the present invention, processing operations are performed with shared elements for efficiency of implementation. In addition, the selection unit and function and the combinatorial circuit and function can also be combined. Other configurations allow other selections, e.g., $R_n=0$ for either $R_{n-1}=0$ or $R_{n-1}=1$, and will allow selection of subsets of the result number R for comparison.

A reduction of the circuit elements required for a programmable compare operation is possible recognizing the commonality in the logic for the different fast compare operation. FIG. 3 shows a block diagram of one embodiment in which the logic required for implementation of the programmable comparison circuit has been reduced. Recognizing that if $R_n$ does not equal zero for $R_{n-1}=0$, then $R_n$ must equal "1". The $R_n=1$ if $R_{n-1}=0$ comparison operation is replaced by an inversion of the $R_n=0$ if $R_{n-1}=0$ operation output signal. Similarly, the $R_n=1$ if $R_{n-1}=1$ comparison operation is replaced by inversion of the $R_n=1$ if $R_{n-1}=0$ signal, and independently, the $R_n=0$ if $R_{n-1}=1$ comparison operation could be replaced by the inversion of $R_n=1$ if $R_{n-1}=1$ operation output signal.

FIG. 4 shows a block diagram for one implementation for a reduced number of elements in the fast comparison circuit $20_n$ of a programmable compare circuit. This diagram uses the Kill/Generate/Propagate notation of Bosshart et al. where, for addition, $K_n$ is the AND logic operation for the inverse of $A_n$ and the inverse of $B_n$, $G_n$ is the AND logic operation for $A_n$ and $B_n$, and $P_n$ is the exclusive OR logic operation for $A_n$ and $B_n$. Those skilled in the art will know the definition of K, G, and P for other arithmetic logic unit (ALU) functions, e.g., subtraction, and will know the various implementations for the generation of these values. For the embodiment illustrated in FIG. 4, the programmable one-bit-zero calculator block requires only two K/G/P generator units 11, an exclusive OR logic gate, and an inverting amplifier in addition to two selection units. Selection unit $41_n$, controlled by $S_{n-1}$, selects whether the Kill ($K_{n-1}$) or the Generate ($G_{n-1}$) signal from the $(n-1)^{th}$ K/G/P calculator is input to the exclusive OR logic gate $42_n$. $K_{n-1}$ is selected if $S_{n-1}=0$, $G_{n-1}$ is selected if $S_{n-1}=1$. The second selection unit $45_n$, controlled by a combination of $S_n$ and $S_{n-1}$, selects either the output of the exclusive OR logic gate $42_n$ or the inverse of the exclusive OR logic gate $42_n$, i.e., the output of inverting amplifier $43_n$, to be sent to the combinatorial unit 22. The direct output is selected when the exclusive OR logic operation of $S_n$ and $S_{n-1}$ is 0, the inverse of the exclusive OR logic gate output is selected if the exclusive OR logic operation of $S_n$ and $_{Sn-1}$ is "1". Note that the exclusive OR logic gate $42_n$ could be replaced by an exclusive NOR logic gate and the selection of the direct output and inverted output would be reversed. Also note that the $P_{n-1}$ signal is used in the calculation of $Z_{n-1}$ and $G_n$ and $K_n$ are used in the calculation of $Z_{n+1}$. Thus, only N K/G/P calculators are required for full compare and of these, the $N^{th}$ K/G/P calculator need only calculate $P_N$; $K_N$ and $G_N$ may be useful elsewhere. The least significant bit $0_{th}$ K/G/P calculator need only calculate $K_0$ and $G_0$, but calculation of $P_0$ can be used in the calculation of $R_0$. Table I summarizes the generation of the one-bit-zero $Z_n$ as a function of control signals $S_n$ and $S_{n-1}$.

TABLE I $Z_n = 1$ when ($R_n = 0$, $R_{n-1} = 0$) and ($S_n = 0$, $S_{n-1} = 0$)
$Z_n = 1$ when ($R_n = 1$, $R_{n-1} = 0$) and ($S_n = 1$, $S_{n-1} = 0$)
$Z_n = 1$ when ($R_n = 0$, $R_{n-1} = 1$) and ($S_n = 0$, $S_{n-1} = 1$)
$Z_n = 1$ when ($R_n = 1$, $R_{n-1} = 1$) and ($S_n = 1$, $S_{n-1} = 1$)
$Z_n = 0$ otherwise FIG. 5 shows a block diagram of a preferred embodiment for implementation of the programmable fast comparison circuit $20_n$ that has a few more elements than that of FIG. 4, but uses a single selection unit $55_n$, thereby providing greater flexibility, as will be described below. Two exclusive OR logic gates, $51_n$ and $52_n$: one with inputs $P_n$ and $G_{n-1}$, the other with inputs $P_n$ and $K_{n-1}$. The correct $Z_n$ can be selected from among the two exclusive OR logic gate output signals and their inverses, based on the values of $S_n$ and $S_{n-1}$. Again, the exclusive OR logic gates can be replaced by exclusive NOR logic gates and the selection of the output signals and the inverse of the output signals reversed.

Those skilled in the art will recognize that the selection units in the programmable comparison circuits can be designed to select the inverse of the zero-bit-one signal for output to the combinatorial circuit. This change allows use of a dynamic NOR logic gate for the combinatorial circuit 22. This logic gate is illustrated in FIG. 6. The complement of the one-bit-zero signals are used as the input signals and combined in a NOR logic gate to generate the $Z_{TOTAL}$. If any one of the matches fails, the associated complement of the zero-bit-one signal will be high, resulting in $Z_{TOTAL}$ being low. This implementation of a logic gate is a particularly efficient for the combinatorial circuit.

In the another embodiment, some or all of the selection function is combined with the combinatorial circuit 22. FIG. 7 illustrates such a combination for the second selection unit $45_n$ of the embodiment illustrated in FIG. 4, where the selection signal $X_n$ is the exclusive OR logic operation on $S_n$ and $S_{n-1}$. FIG. 8 shows a combination of the combinatorial circuit 22 and the selection unit $55_n$ of the embodiment illustrated in FIG. 5, where one of $(X00, X01, X10, X11)_n$ is high and the others low, depending on the values of $S_n$ and $S_{n-1}$.

The combining of the selection function and the combinatorial function allow additional flexibility. For example, if the values of the m most significant bits are not of concern, then all $(X00, X01, X10, X11)_n$ can be set low for n from N−m to N−1, inclusive. A similar setting of selection bits can be performed for "don't care" lower order bits. Some ambiguity results when a fast compare is performed for a bit that is one more significant than a bit with a "don't care" condition. For example, if $R_n$ is to be 0 but $R_{n-1}$ is a don't care, a test to see that $R_n$ is 0 for both $R_{n-1}=0$ and $R_{n-1}=1$ would be a test for a sufficient but not necessary condition. Similarly, a test for [$R_n=0$ for $R_{n-1}=0$ OR (not exclusive) $R_n=0$ for $R_{n-1}=1$] would be a test for a necessary, but not sufficient condition. The test for the sufficient condition is done with a fast comparison operation. The necessary condition is also tested with a fast comparison operation, either in parallel with the sufficient condition test or if the sufficient condition fails. If either the sufficient condition is met or the necessary condition is not met, then the result is known. Otherwise, the carry must be propagated to the most significant "don't care" bit position and the fast compare completed from there, or the full calculation can be done. The ripple of the carry can be started in parallel with the condition testing.

Testing whether or not a result is less than some power of 2 is a special case of the foregoing discussion. To test whether a result is less than $2^m$, the N−m most significant bits must be zero; the values of the lower m bits do not matter ("don't care" condition). A necessary condition for this result to be true is the $R_n=0$ for $R_{n-1}=0$ for n greater than m. This situation can be tested with a fast comparison operation with a "don't care" condition for n from 0 to m+1, inclusive. A sufficient condition is that, in addition, $R_m=0$ for both $R_{m-1}=1$ and $R_{m-1}=0$. This situation can be tested with fast comparison operation enabling $X01_m$ and $X00_m$, all others "don't care". A technique for testing when result number R is less than $2^m$ is to first test for the above necessary condition. If this condition is satisfied, then test for the foregoing sufficient condition. Alternatively, these two tests could be performed in parallel. If either the necessary condition is not met or the sufficient condition is met, the answer is known. Otherwise, the calculation must be carried to the $m^{th}$ bit to see if that bit is zero.

While the invention has been described with particular reference to the preferred embodiment, it will be under stood by those skilled in the art that various changes may be made and equivalents substituted for elements of the preferred embodiment without departing from the invention. In addition, many modifications may be made to adapt a particular situation and material to a teaching of the present invention without departing from the essential teachings of the present invention. For example, as shown in the Bosshart reference (cf. FIG. 9), the K/G/P generator can be programmed to implement selectively arithmetic or logic operations. This programmability with respect to functionality can be combined with the programmability with respect to the specified number S of the present invention.

As is evident from the foregoing discussion, certain aspects of the invention are not limited to the particular details of the examples illustrated, and it is therefore contemplated that other modifications and applications will occur to those skilled in the art. It is accordingly intended that the claims shall cover all modifications and applications as do not depart from the spirit and scope of the invention.

What is claimed is:

1. A programmable fast comparison unit for use in apparatus providing a fast comparison between a specified binary number and a result binary number, said result binary number resulting from a binary operation involving two operands, said fast comparison unit comprising:

control signals for indicating a selection of the specified binary number;

a plurality of compare units, each compare unit receiving an $n^{th}$ and $(n-1)^{th}$ bits of each operand, said each compare unit responsive to said control signals for providing a predetermined signal when an $n^{th}$ bit of said result binary number is the same as a selectable $n^{th}$ bit of said specified binary number and conditional on an $(n-1)^{th}$ bit of said result binary number being equal to a selectable $(n-1)^{th}$ bit of said specified binary number.

2. The programmable fast comparison unit of claim 1 wherein the combinations of the selectable $n^{th}$ bit and $(n-1)^{th}$ are (0,0), (0,1), (1,0), and (1,1).

3. The programmable fast comparison unit of claim 2 wherein said operands are N bit position in length, said programmable fast comparison unit including less than N+1 kill/generate/propagate units.

4. The programmable fast comparison unit of claim 1 wherein a plurality of selectable $n^{th}$ bit and $(n-1)^{th}$ bit combinations can be selected simultaneously.

5. The programmable fast comparison unit of claim 1 wherein at least one compare unit includes a kill/generate/propagate unit, wherein the operation implemented by said kill/generate/propagate unit is selected by control signals.

6. The programmable fast comparison unit of claim 1 wherein said binary operation is an addition operation.

7. A method of providing a programmable fast comparison between a result binary number resulting from an operation on two operands and a specified binary number, said method comprising the steps of:

selecting said specified binary number;

applying operand signal bit pairs from a corresponding bit pair position of said two operands to a programmable fast comparison unit;

applying first control signals to said programmable fast comparison unit indicative of bit pairs of said specified number for a bit pair position corresponding to said corresponding bit pair position;

generating a bit-signal indicative of a match between corresponding bit pair position bits of said result number and of said specified binary number.

8. The method of claim 7 further comprising the step of generating selected bit signals for a plurality of selected result number bit pair positions; and generating a combined bit signal indicative of a generation of a bit signal for all said selected result number bit pair positions.

9. The method of claim 8 wherein said selected result number bit positions are selected by second control signals.

10. The method of claim 9 wherein said second control signals are indicative of a preselected bit of a bit pair of said specified number.

11. The method of claim 7 wherein said first control signals are indicative of more than one bit pair for an result number bit pair.

12. The method of claim 7 wherein said first control signals identify a corresponding bit pair position for said result number.

13. The fast comparison unit of claim 12 wherein said output signals are each a logic low signal for an affirmative comparison and said combinatorial circuit includes a NOR logic gate.

14. Apparatus for providing a programmable fast comparison between a result number of a binary operation of two operands and a specified number, said apparatus comprising:

a plurality of fast compare units, each fast compare unit having a pair of operand binary signals of a same number of bits applied thereto, each fast compare unit having a control signal indicative of a pair of specified binary bits of said specified number, said fast comparison unit generating an output signal indicative of a relationship between said pair of specified binary bits and a pair of bits of said result numbers resulting from said binary operation; and a combinatorial circuit having output signals from said fast compare units applied thereto, said combinatorial circuit generating a confirmation signal when all of said output signals have a selected value.

15. Apparatus for providing a fast comparison between a calculated result of a binary operation involving two operands and a specified result, said apparatus comprising:

a plurality of programmable fast compare units responsive to $n^{th}$ and $(n-1)^{th}$ bit pairs of said operands and to control signals representing $n_{th}$ and $(n-1)^{th}$ bit pairs of said specified result, each fast compare unit providing an output signal indicative of a relationship between a calculated result bit pair and an associated specified result bit pair; and a combinatorial circuit for combining said output signals of said fast compare units, said combinatorial circuit generating an output signal indicative of said predetermined relationship of said calculated result and said specified result;

wherein said specified result includes at least one "don't care" bit position.

16. The apparatus of claim 15 wherein said output signals of said fast compare units are each a logic low signal for an affirmative comparison.

17. The apparatus of claim 16 wherein said combinatorial circuit includes a dynamic NOR logic gate.

18. A method of providing a fast determination of a sufficient condition that a result number of a two operand, binary operation is less than a preselected $m^{th}$ power of two, said method comprising the steps of:

applying operand signals to a fast comparison apparatus, said apparatus configured to determine when an $(m+1)^{th}$ bit through a most significant bit of said result number are equal to zero independent of $(m-1)^{th}$ result bit.

19. A method for providing a fast determination of a necessary condition that a result number of a two operand binary operation is less than a preselected $m^{th}$ power of two, said method comprising the step of:

applying operand signals to a fast comparison apparatus, said apparatus configured to determined when said $m^{th}$ through the most significant bits of said result number are each "0" independent of a value of an $(m-1)^{th}$ bit.

20. A method of providing a fast determination of a sufficient condition that an $m^{th}$ bit of a result number of a two operand binary operation is equal to a specified value, said method comprising the steps of:

determining that said result $m^{th}$ bit equals said specified value when the $(m-1)^{th}$ result bit equals zero; and determining that said result $m^{th}$ bit equals said specified value when said $(m-1)^{th}$ bit equals one.

21. A method of providing a fast determination of a necessary condition that the $m^{th}$ bit of a result number of a two operand binary operation is equal to a specified value, said method comprising the steps of:

determining that at least one of the following steps is true;

determining that said result mlh bit equals said specified value when the $(m-1)^{th}$ result bit equals zero; and determining that said result $m^{th}$ bit equals said specified value when the $(m-1)^{th}$ result bit equals one.

* * * * *